US007831770B2

(12) United States Patent
Franklin

(10) Patent No.: US 7,831,770 B2
(45) Date of Patent: *Nov. 9, 2010

(54) COMBINING RESOURCES OF MULTIPLE BIOS ROMS AND MANAGING THEM AS A SINGLE ENTITY

(75) Inventor: Chris R. Franklin, Merrimack, NH (US)

(73) Assignee: Broadcom Corporation, Irvine, CA (US)

( * ) Notice: Subject to any disclaimer, the term of this patent is extended or adjusted under 35 U.S.C. 154(b) by 555 days.

This patent is subject to a terminal disclaimer.

(21) Appl. No.: 11/980,549

(22) Filed: Oct. 31, 2007

(65) Prior Publication Data

US 2008/0066087 A1 Mar. 13, 2008

Related U.S. Application Data

(63) Continuation of application No. 10/977,945, filed on Nov. 1, 2004, now Pat. No. 7,302,521.

(51) Int. Cl.
G06F 12/00 (2006.01)
G06F 9/44 (2006.01)
(52) U.S. Cl. .................. 711/114; 717/168; 717/170
(58) Field of Classification Search .................. 711/114; 717/168, 169, 170, 172, 173
See application file for complete search history.

(56) References Cited

U.S. PATENT DOCUMENTS

| 7,073,017 B2 | 7/2006 | Yamamoto |
| 7,302,521 B2 | 11/2007 | Franklin |
| 2003/0145130 A1 | 7/2003 | Schultz et al. |

OTHER PUBLICATIONS

David A. Patterson et al., "A Case for Redundant Arrays of Inexpensive Disks (RAID)," 1988, Computer Science Division, Dept. of Electrical Engineering and Computer Science, University of California, ACM 0-89791-268-3, pp. 109-116, 8 pages.
"Raid," SearchStorage.com Definitions, May 2004, 3 pages.

*Primary Examiner*—Jack A Lane
(74) *Attorney, Agent, or Firm*—Sterne, Kessler, Goldstein & Fox PLLC

(57) ABSTRACT

A method and related computer program product for combining resources of multiple RAID controllers and managing them as a single entity, comprising searching the RAID controllers for the most appropriate version of the firmware to be executed, determining whether a more appropriate version of the firmware was previously loaded into system memory, unloading inappropriate versions of the firmware, loading the most appropriate version of the firmware and initializing all RAID controllers as a commonly managed entity having combined resources.

20 Claims, 5 Drawing Sheets

US 7,831,770 B2

COMBINING RESOURCES OF MULTIPLE BIOS ROMS AND MANAGING THEM AS A SINGLE ENTITY

CROSS-REFERENCE TO RELATED APPLICATIONS

This application is a continuation of U.S. application Ser. No. 10/977,945, filed on Nov. 1, 2004, now U.S. Pat. No. 7,302,521, which is incorporated herein by reference in its entirety.

FIELD OF THE INVENTION

The disclosed invention relates to RAID controllers and more specifically to a method and computer program product for combining resources of multiple RAID controllers and commonly managing them as a single entity from a BIOS and device driver perspective.

BACKGROUND OF THE INVENTION

There are many applications, particularly in a business environment, where there are needs beyond what can be fulfilled by a single hard disk, regardless of its size, performance or quality level. Many businesses can't afford to have their systems go down for even an hour in the event of a disk failure. They need large storage subsystems with capacities in the terabytes. And they want to be able to insulate themselves from hardware failures to any extent possible. Some people working with multimedia files need fast data transfer exceeding what current drives can deliver, without spending a fortune on specialty drives. These situations require that the traditional "one hard disk per system" model be set aside and a new system employed. This technique is called Redundant Arrays of Inexpensive Disks or RAID. ("Inexpensive" is sometimes replaced with "Independent", but the former term is the one that was used when the term "RAID" was first coined by the researchers at the University of California at Berkeley, who first investigated the use of multiple-drive arrays in 1987. See D. Patterson, G. Gibson, and R. Katz. "A Case for Redundant Array of Inexpensive Disks (RAID)", Proceedings of ACM SIGMOD '88, pages 109-116, June 1988.

The fundamental structure of a RAID is the array. An array is a collection of drives that is configured, formatted and managed in a particular way. The number of drives in the array, and the way that data is split between them, is what determines the RAID level, the capacity of the array, and its overall performance and data protection characteristics.

When the operating system (hereafter referred to as "OS") or an application wants to access the hard disk drive it traditionally employs the system BIOS services to do this. BIOS is the abbreviation for Basic Input Output System. The system BIOS provides basic input and output routines for communicating between the software and the peripherals such as the keyboard, monitor and disk drive. The system BIOS is built-in software that determines what a computer can do without accessing programs from a disks. The system BIOS generally contains all the code required to control the keyboard, monitor, disk drives, serial communications and a number of miscellaneous functions.

The system BIOS is typically placed on a ROM chip that comes with the computer (it is often referred to as a ROM BIOS). This ensures that the BIOS will always be available and will not be damaged by disk failures. It also makes it possible for a computer to boot itself.

Processors in a computer system typically run in 16-bit mode. In this mode various segment registers such as code, data, stack and extended segment registers can be used to access up to 1 MB of system memory for BIOS purposes. It should be noted that the amount of memory that can be accessed or the method to access the memory can differ between motherboards or be modified by one skilled in the art. Currently approximately 1 MB of system memory is available to load the BIOS of all devices in the system.

In a RAID array several disks are grouped together in various organizations to improve either the performance or the reliability of a computer's storage system. These disks are grouped and organized by a RAID controller. Since the system BIOS cannot manage the I/O to a RAID array, each RAID controller in the system has to load its own firmware into the system memory.

On system startup, the system BIOS loads the firmware of all the devices present in the system and allocates code segment and data segment space for each device in the limited 1 MB of system memory. Data and stack segments are set up by the device firmware whereas the code segment is set up by the system BIOS. If the device firmware takes up too much space in system memory it will result in system failure. OEM manufacturers have to follow certain standards set by motherboard manufacturers that limit the firmware and POST (Power On Self Test) sizes between 16 Kb and 32 Kb.

If the system has two compatible RAID cards, the firmware for both the cards will be loaded during startup thereby resulting in a waste of memory resources and increasing startup latency. This occurs because the cards are not aware of each other's presence in the system. If the two RAID controller cards mentioned above have eight channels each, then each controller will allocate 6 channels to storage drives, one channel for a parity drive and the last channel for a hot spare. Thus the system has two parity drives and two hot spares where one of each will suffice. If there are more than two RAID controllers in the system there will be an even greater waste of resources. If the RAID controllers were aware of each others' presence, they could be managed as one entity, POST would need to be run only once, and the latest version of firmware could be used along with optimal use of available channels by combining card resources. In the above example, if the RAID controllers were a commonly managed entity, fourteen channels could be dedicated to storage drives instead of twelve and they could use just one parity drive and hot spare drive.

What is needed is a method to combine the resources of multiple RAID controllers and manage them as a single entity.

SUMMARY OF THE INVENTION

The invention comprises a method and related computer program product for combining resources of multiple RAID controllers and managing them as a single entity, comprising searching the RAID controllers for the most appropriate version of the firmware to be executed, determining whether a more appropriate version of the firmware was previously loaded into system memory, unloading inappropriate versions of the firmware, loading the most appropriate version of the firmware and initializing all RAID controllers as a commonly managed entity having combined resources.

Additional features and advantages of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed. The detailed description is not intended to limit the scope of the claimed invention in any way.

DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
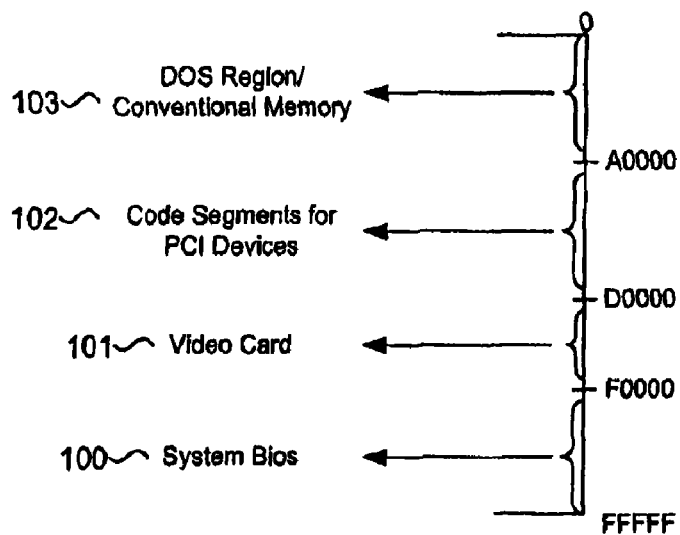
FIG. 1 shows a sample allocation of system memory.

FIG. 1 shows a sample allocation of 1 MB of system memory for the system BIOS and the firmware of all devices in the system. All memory demarcations are approximate. The amount of system memory allocated may vary between motherboard manufacturers. Assume memory location D0000 to FFFFF is allocated to the system BIOS 100, C0000 to D0000 is allocated for the video card 101, A0000 to C0000 is allocated for code segments 102 of devices in the system and 0 to A0000 is allocated for the DOS region 103 which stores the data segments for devices in the system.

Although the exemplary embodiment presented in this invention combines the resources of RAID controller cards and manages them as a single entity, it would be apparent to a person skilled in the relevant arts that the technique can be extended to Peripheral Component Interface (PCI) devices or other types devices in the system. The terms RAID controller, RAID controller card or card are used interchangeably.

One aspect of the invention, relates to loading a single code and data segment for each compatible card in the system.

Figure 2:
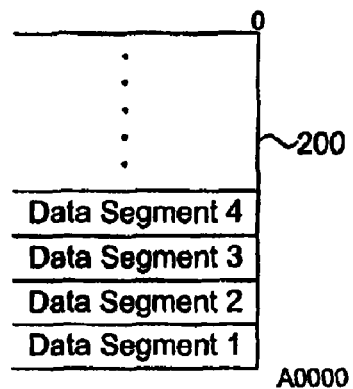
FIG. 2 shows a conventional DOS region of system memory.

FIG. 2 shows sample contents of the typical DOS region 103 of system memory. When the system boots up, each card in the system runs its firmware which loads its respective data segment into the DOS region 103. Data segments for each card in the system have been individually loaded as shown by 200.

Figure 3:
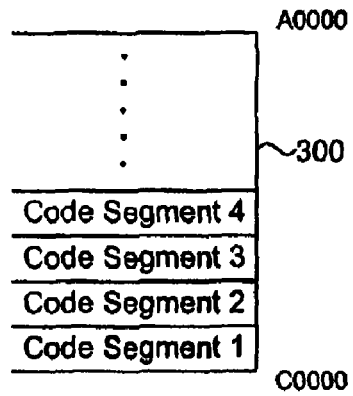
FIG. 3 shows a conventional code segment region of system memory.

FIG. 3 shows sample contents of the typical code segment region 102. When the system boots up, each card in the system runs its firmware which loads its respective code segment into the code segment region 102. Here we see that the code segment for each card in the system have been individually loaded as shown in 300.

If the cards in the system are compatible and can use common firmware, it is evident from FIGS. 2 and 3 that loading each card's data and code segment and running POST individually for each card results in a waste of memory resources and increases startup latency.

Figure 4:
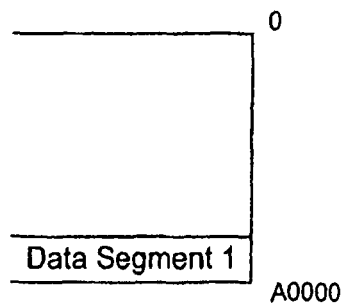
FIG. 4 shows an optimized DOS region of system memory.
Figure 5:
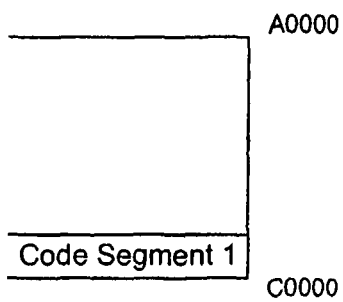
FIG. 5 shows an optimized code segment region of system memory.

For compatible cards in the system FIGS. 4 and 5 show a single data and code segment loaded into the optimized DOS and code segment regions respectively. With the configuration shown in FIGS. 4 and 5, only one POST session will be executed for each compatible card in the system. It is clear from comparing FIGS. 2 and 3 to FIGS. 4 and 5, that there is considerable optimization of system memory usage and significant reduction in startup latency by loading and executing only one firmware.

Another aspect of the invention is the ability to combine resources of cards capable of running a common firmware as shown in FIGS. 4 and 5.

Figure 6:
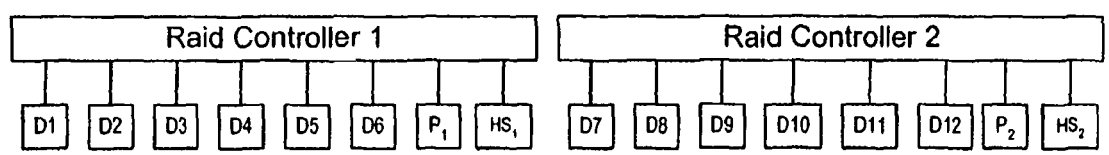
FIG. 6 shows conventionally organized RAID controller cards.

FIG. 6 shows two RAID controller cards that have individually loaded separate firmware in the system memory and are unaware of each others' presence. This configuration results in the first six channels of RAID controller 1 being assigned to disk drives D1 to D6, the seventh and eight channels are assigned to a parity disk P1 and a hot spare HS1 respectively. Similarly for RAID controller 2, the first six channels are assigned to disk drives D7 to D12, the seventh and eight channels are assigned to another parity disk P2 and hot spare HS2. Here, each controller has its own parity disk and hot spare when a single parity disk and hot spare would suffice. Thus there is a waste of two channels which can be used for storage drives.

Figure 7:
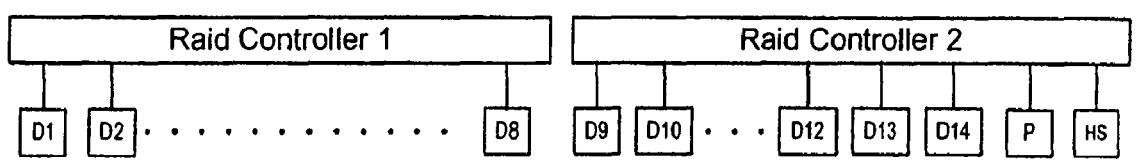
FIG. 7 shows RAID controller cards configured to have combined resources and common management.

FIG. 7 shows the same cards from FIG. 6 which are now operating on common firmware and have combined resources. RAID controller 1 now uses all eight channels for disk drive D1 to D8. RAID controller 2 can now accommodate disk drives D13 and D14 in addition to D9 through D12. Only one parity drive P and one hot spare HS is now required. If more than two RAID controllers are combined, resource utilization is further optimized.

Figure 8:
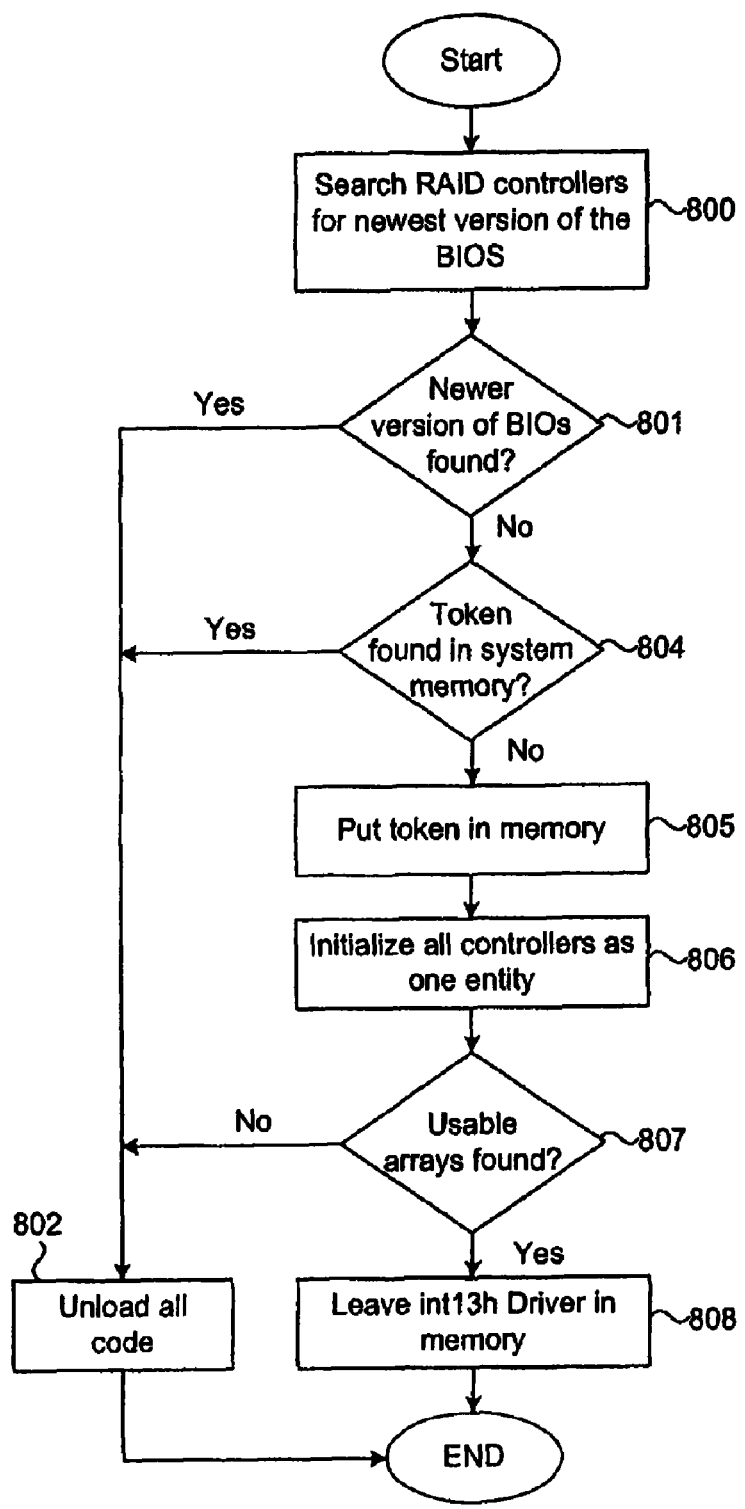
FIG. 8 shows an operational flowchart for combining the resources of all RAID controller cards and initializing them as a commonly managed entity.

An exemplary method employing the features of the invention proceeds along the following steps as shown in the flowchart of FIG. 8. The system BIOS loads each card's driver in sequence. These steps are executed by each RAID controller card in the system.

First, in step 800, each RAID card in the system is scanned for the latest version of firmware. It should be noted that different embodiments of the invention may search for different types or versions of firmware without departing from the spirit of the invention.

Next, in step 801, it is determined whether the latest version of the firmware found in a RAID card in the system is newer than the one loaded by the current RAID card.

If a newer version of firmware has been found in another card, then all the code loaded by the current card's firmware (the data and code segments) is unloaded from system memory in step 802.

If a newer version of firmware was not found in step 801, then the process proceeds to step 804 where the card checks for the presence of a token. The purpose of the token is to indicate that the latest version of firmware has been loaded in system memory. It should be noted that other embodiments may place the token either in FLASH memory in each RAID card or in another memory location in the system without departing from the spirit of the invention.

If a token is found in system memory in step 804, this indicates that the latest version of firmware was previously loaded into system memory. The process then proceeds to step 802 to cause the card's firmware to unload its code from system memory.

If a token is not found in step 804, this indicates that the current card's firmware is the latest version. In step 805, the card's firmware proceeds to place a token in the system memory to notify subsequently loaded compatible cards in the system that the latest firmware has been found.

Next, in step 806, the card's firmware proceeds to initialize all compatible RAID controller cards as a single entity having combined resources and common management.

Next, in step 807 the card's firmware proceeds to check for any redundant arrays in the system. If no redundant arrays are found in the system, then the card's firmware proceeds to step 802 and unloads its code from system memory.

If a redundant array is found, then in step 808, the card's firmware leaves the int13h driver in the system memory to enable I/O to the redundant array.

The current invention can be extended to provide support for combining RAID controller cards that have distinct channel types such as SCSI, FC, SAS or IDE. This is a powerful method that can allow various combinations having different channel types since all controller cards will be commonly managed.

Even though the exemplary embodiment presented herein combines only compatible RAID controller cards, the invention is extendible to combining diverse cards or devices such as memory, ethernet, CPU and channel boards and manage them as a common entity having diverse parts. These cards or devices can conform to either the PCI, IDE or any other industry standard.

Figure 9:
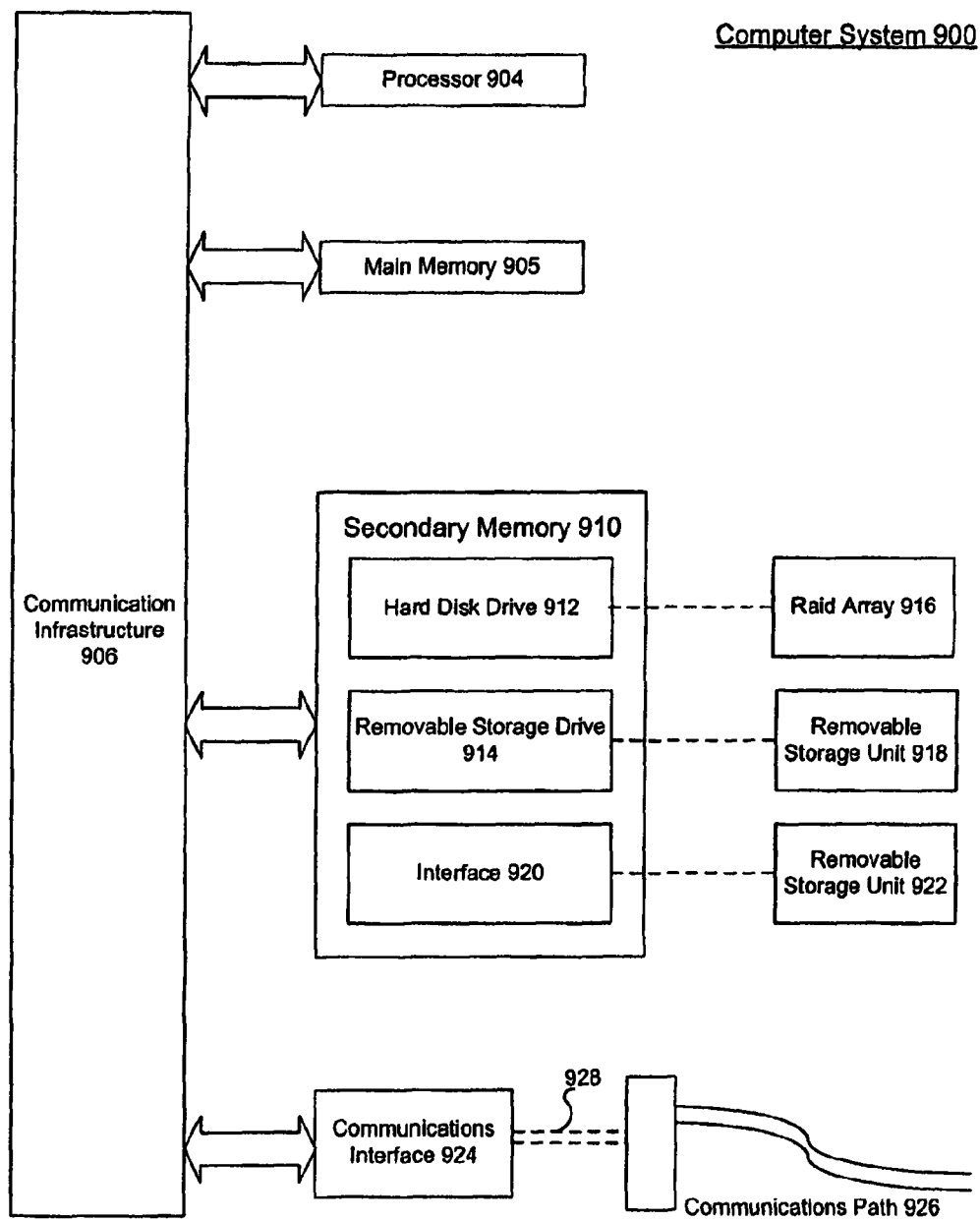
FIG. 9 is a block diagram of a computer system on which the present invention can be implemented.

The following description of a general purpose computer system is provided for completeness. The present invention can be implemented in hardware, or as a combination of software and hardware. Consequently, the invention may be implemented in the environment of a computer system or other processing system. An example of such a computer system 900 is shown in FIG. 9. The computer system 900 includes one or more processors, such as processor 904. Processor 904 can be a special purpose or a general purpose digital signal processor. The processor 904 is connected to a communication infrastructure 906 (for example, a bus or network). Various software implementations are described in terms of this exemplary computer system. After reading this description, it will become apparent to a person skilled in the relevant art how to implement the invention using other computer systems and/or computer architectures.

Computer system 900 also includes a main memory 905, preferably random access memory (RAM), and may also include a secondary memory 910. The secondary memory 910 may include, for example, a hard disk drive 912, and/or a RAID array 916, and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918, represents a floppy disk, magnetic tape, optical disk, etc. As will be appreciated, the removable storage unit 918 includes a computer usable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a PCMCIA slot and card, etc. Software and data transferred via communications interface 924 are in the form of signals 928 which may be electronic, electromagnetic, optical or other signals capable of being received by communications interface 924. These signals 928 are provided to communications interface 924 via a communications path 926. Communications path 926 carries signals 928 and may be implemented using wire or cable, fiber optics, a phone line, a cellular phone link, an RF link and other communications channels.

The terms "computer program medium" and "computer usable medium" are used herein to generally refer to media such as removable storage drive 914, a hard disk installed in hard disk drive 912, and signals 928. These computer program products are means for providing software to computer system 900.

Computer programs (also called computer control logic) are stored in main memory 908 and/or secondary memory 910. Computer programs may also be received via communications interface 924. Such computer programs, when executed, enable the computer system 900 to implement the present invention as discussed herein. In particular, the computer programs, when executed, enable the processor 904 to implement the processes of the present invention. Where the invention is implemented using software, the software may be stored in a computer program product and loaded into computer system 900 using raid array 916, removable storage drive 914, hard drive 912 or communications interface 924.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A system to manage Redundant Array of Inexpensive Disks (RAID) controllers as a common entity having combined resources, comprising:
   system memory; and
   a plurality of RAID controllers;
   wherein a first RAID controller is enabled to search each RAID controller for a latest version of firmware, determine whether the latest version of the firmware has been loaded into system memory previously, unload its current version of firmware from system memory if the latest version of firmware has been previously loaded into system memory and initialize all RAID controllers to be a commonly managed entity having combined resources.

2. The system of claim 1, wherein the first RAID controller is enabled to load its current version of firmware into system memory if the latest version of firmware has not been previously loaded into system memory and is not found in any other RAID controller.

3. The system of claim 1, wherein the first RAID controller is enabled to check for a token in memory of a second RAID controller if the latest version of firmware is not present in the second RAID controller.

4. The system of claim 3, wherein the first RAID controller is enabled to unload its current version of firmware from system memory upon locating the presence of said token in the second RAID controller.

5. The system of claim 3, wherein the first RAID controller is enabled to place a token in memory of the second RAID controller if a token is not present.

6. The system of claim 1, wherein the first RAID controller is enabled to search for redundant arrays in the system.

7. The system of claim 6, wherein the first RAID controller is enabled to unload its current version of firmware from system memory upon detecting absence of said redundant arrays in the system.

8. The system of claim 6, wherein the first RAID controller is enabled to place an int13h driver in system memory upon locating the presence of said redundant arrays in the system.

9. The system of claim 1, wherein the first RAID controller is enabled to manage I/O channels of other RAID controllers.

10. The system of claim 1, wherein the first RAID controller is enabled to aggregate RAID controllers having distinct channel types and thereby allow for a plurality of channel combinations.

11. The system of claim 1, wherein the first RAID controller is enabled to commonly manage distinct cards as a single entity.

12. A system to manage distinct devices as a common entity having combined resources, comprising:
    system memory; and
    a plurality of devices;
    wherein a first device controller is enabled to search each device for a latest version of firmware, determine whether the latest version of the firmware has been loaded into system memory previously, unload its current version of firmware from system memory if the latest version of firmware has been previously loaded into system memory and initialize all devices to be a commonly managed entity having combined resources.

13. The system of claim 12, wherein the first device is enabled to load its current version of firmware into system memory if the latest version of firmware has not been previously loaded into system memory and is not found in any other device.

14. The system of claim 12, wherein the first device is enabled to check for a token in memory of a second device if the latest version of firmware is not present in the second device.

15. The system of claim 14, wherein the first device is enabled to unload its current version of firmware from system memory upon locating the presence of said token in the second device.

16. The system of claim 14, wherein the first device is enabled to place a token in memory of the second device if a token is not present in the memory of the second device.

17. The system of claim 16, wherein the first device is enabled to place an int13h driver in system memory upon detecting the presence of said redundant arrays in the system.

18. The system of claim 12, wherein said devices are one or more of memory devices, channel boards, Redundant Array of Inexpensive (RAID) controllers and Ethernet controllers.

19. The system of claim 12, wherein the first device is enabled to manage I/O channels of other devices in the system.

20. The system of claim 12, wherein the first device is enabled to aggregate devices having distinct channel types and thereby allow for a plurality of channel combinations.

* * * * *